Dec. 4, 1962 D. D. DUNLOP ETAL 3,067,268
PREVENTION OF REACTOR FOULING
Filed Oct. 6, 1958 2 Sheets-Sheet 1
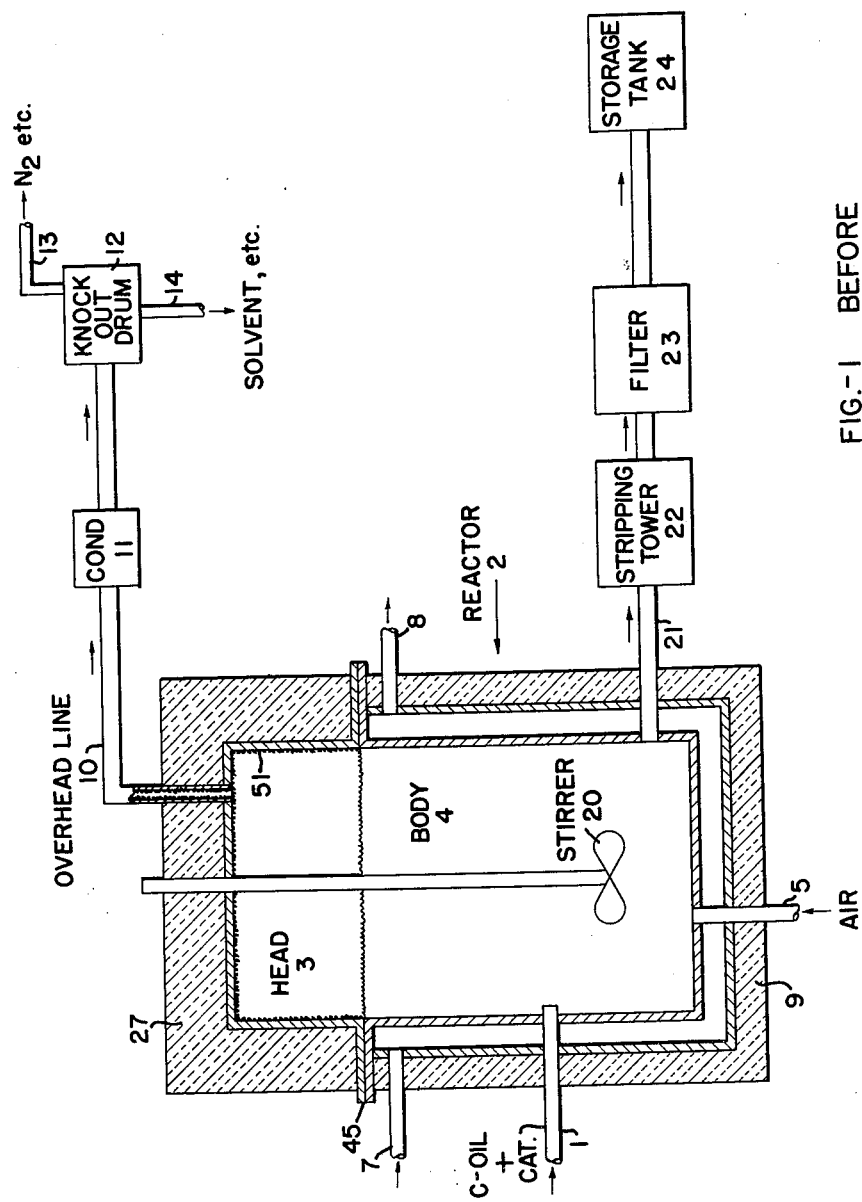
FIG.-1  BEFORE
Donald Dunwody Dunlop
John Dana Koontz      Inventors
George Oliver Hillard, Jr.
By  *W. H. Smyers*   Attorney

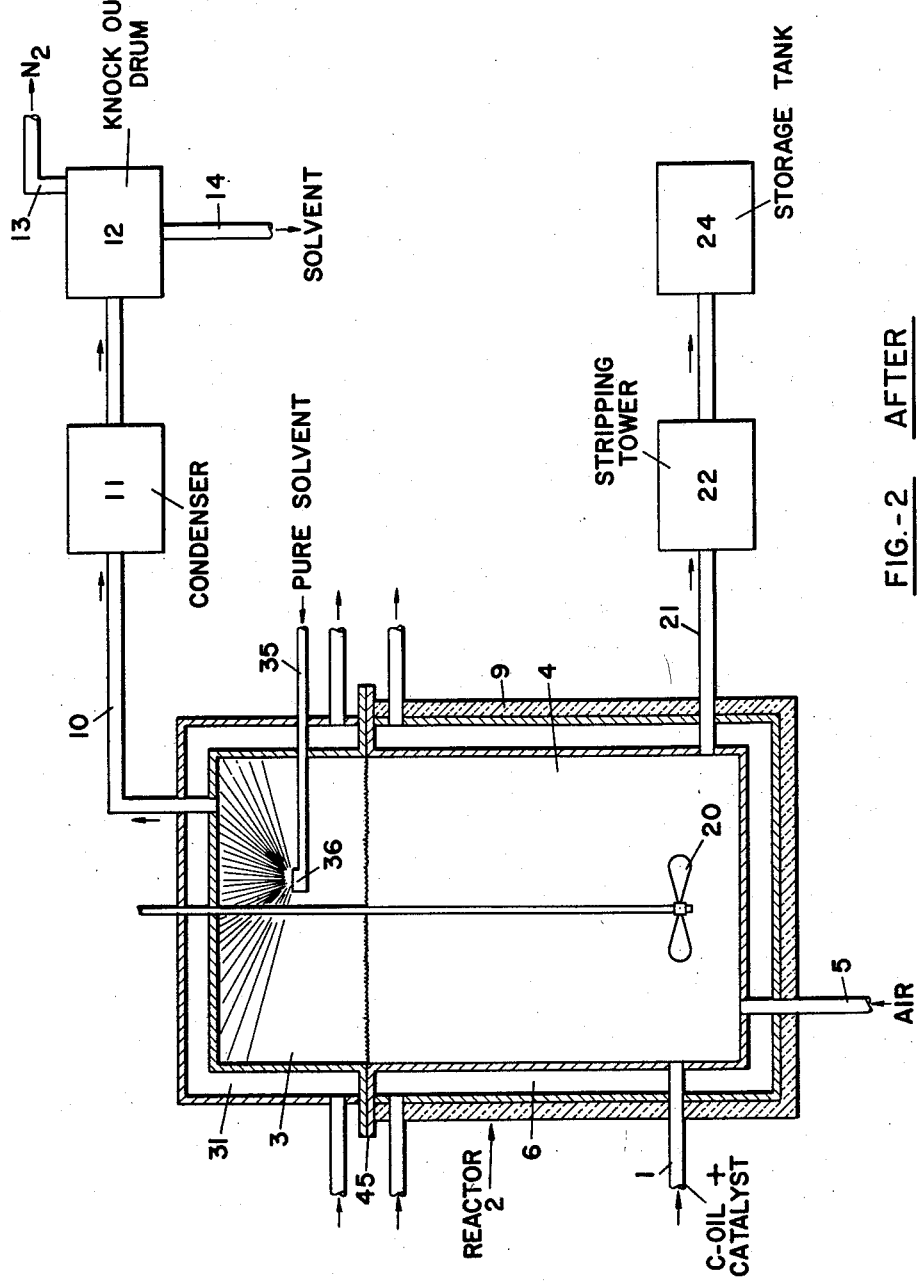
FIG.-2  AFTER
Donald Dunwody Dunlop
John Dana Koontz
George Oliver Hillard, Jr.
Inventors
By  *W. H. Ampers*  Attorney 3,067,268
PREVENTION OF REACTOR FOULING
Donald Dunwody Dunlop, John Dana Koontz and
 George Oliver Hillard, Jr., all of Baton Rouge, La., assignors to Esso Research and Engineering Company, a corporation of Delaware
Filed Oct. 6, 1958, Ser. No. 765,610
9 Claims. (Cl. 260—669)

This invention relates to a method and an apparatus for preventing reactor fouling and more particularly to an improved polydiolefin which has been air blown in a reactor without fouling occurring therein.

It is known in the art to oxidize a polydiolefin oil in a hydrocarbon solvent by air blowing the solution therefrom in a reactor. However, it has been found that fouling occurs in the reactor head and overhead line; in other words, solid polymer is deposited thereon. This fouling has a deleterious effect upon the overall process; and therefore, the final oxidized polymer is relatively cloudy. Consequently, an expensive and time consuming filtration operation is required to provide a relatively clear end product.

In the past, various methods have been utilized to remove polymer from the walls of a reactor. For example, U.S. Patent 2,581,094 discloses a method for preventing fouling during the preparation of a polydiolefin drying oil by flushing the reactor with a portion of the liquid phase comprising both polymer and solvent. However, this and other known methods would be inoperative for the preparation of the instant air-blown polydiolefin; the residual nitrogen from the air, used in the oxidation, would strip off the solvent and more polymer would actually be deposited upon the reactor walls.

However, it has now been discovered that fouling can be prevented during the preparation of an oxidized polydiolefin by maintaining a temperature below 200° F. on the internal surface of the head of the reactor. In accordance with one embodiment of this invention, a solution is prepared comprising a polydiolefin oil in a hydrocarbon solvent. This solution is air blown in a reaction zone in such a manner as to provide a vapor and liquid phase therein. The temperature of the entire interior surface of the gas space above the liquid level of the reaction zone is maintained below 200° F. and a clear oxidized polymer is withdrawn from the liquid phase. In accordance with another embodiment, in addition to the process described above, an externally introduced stream of pure solvent can be sprayed along the interior surface of the gas space in the reaction zone.

Polymeric oils included in this invention are prepared from diolefins, particularly those having 4 to 6 carbon atoms per molecule, such as butadiene, isoprene, dimethyl butadiene, piperylene, and methyl pentadiene. Diolefins, copolymerized with minor amounts of ethylenically unsaturated monomers as styrene, acrylonitrile, methyl vinyl ketone, or with styrenes having alkyl groups substituted on the ring, e.g., paramethyl styrene, dimethyl styrene, etc., may be used.

A preferred diolefin polymeric oil is one prepared by reacting 75 to 100 parts of butadiene and 25 to 0 parts of styrene in the presence of metallic sodium catalyst. Polymerization is carried out in a reaction diluent at temperatures from about 25° to 105° C. with about 0.5 to 5 parts of finely divided sodium per 100 parts of monomers used. The diluent used in the polymerization must boil between about −15° C. and 200° C., in amounts ranging from 100 to 500 parts per 100 parts of monomers; preferred diluents are aliphatic hydrocarbons such as solvent naphtha or straight-run mineral spirits such as Varsol. In order to obtain a water white product, a codiluent, about 10 to 45 parts per 100 parts of monomers, may also be used, consisting of a $C_4$ to $C_8$ aliphatic ether or cyclic ethers and polyethers other than those having a —O—C—O— grouping; particularly useful ethers are dioxane 1,4 and diethyl ether. Finally, it is beneficial to use about 5 to 35 weight percent based on sodium of an alcohol such as methanol, isopropanol, or an amyl alcohol in order to overcome the initial induction period. The resulting product may vary in viscosity from 0.15 to 20 poises, and may be altered as desired for use in the curable liquid mix. The preparation of this oil in the presence of an alkali metal or peroxide catalyst is described in U.S. Patents 2,762,851 and 2,586,594 which are incorporated herein by reference.

These polmeric oils are then oxidized by blowing them with air or oxygen, preferably in the presence of a solvent, as aromatic solvents or solvent mixtures having a kauri butanol value of at least 50. The choice of solvents will depend upon the oxygen content desired in the finished oil, the formation of the coating compositions, and the most economical one to achieve the desired results. Examples of suitable solvents include aromatic hydrocarbons, with or without aliphatic hydrocarbons, boiling up to about 250° C., preferably between 100° and 200° C. The oxidation can be carried out by blowing air or oxygen into the polymer with or without a catalyst. Suitable catalysts are organic salts of metals such as cobalt, lead, iron, and manganese. The naphthenates, octonates, and oleates are especially suitable. These catalysts are used in amounts ranging from 0.001% to 1.0%. The nature of the oxidized diolefin polymer largely depends upon the type of original polymerization and the extent of oxidation which is dependent upon various factors as time, temperature, catalyst, and solvent. Preferred compounds are the oxidized copolymers of 75 to 85% butadiene and 25 to 15% styrene with about 10 to 20% oxygen in the structure.

This invention may be fully understood from the following description in conjunction with the accompanying drawings in which FIG. 1 shows the apparatus and method previously employed for the preparation of an air blown polydiolefin. FIG. 2 demonstrates the apparatus and method utilized in accordance with this invention.

Referring now to FIG. 1, reactor 2 is divided into two parts: head 3 which contains the vapor phase of the reaction zone, and body 4 which contains the liquid phase of the reaction zone. A flange 45 is provided which permits the head portion to be removed from the body portion. The body portion 4 of the reactor is surrounded with a heating jacket 6 and hot water is introduced and removed through lines 7 and 8, respectively, to maintain a temperature therein between 240° and 250° F. Insulation 9 and 27 are included on the outside surface of the reactor body 4 and reactor head 3, respectively. Polydiolefin oil and catalyst are introduced into reactor 2 through line 1. Line 5 transports the air which is subsequently blown through the polydiolefin oil. From the overhead line 10 is withdrawn the vaporized solvent and also the inert nitrogen which results from air blowing. This solvent and nitrogen pass through condenser 11 to knockout drum 12 wherein nitrogen is removed by means of line 13 and solvent is removed through line 14. A stirrer 20 is included within the body of the reactor to provide continual agitation while the polydiolefin oil is being blown with air. However, in accordance with this procedure, fouling occurs on the internal surfaces of the head and overhead line with solid polymer being deposited upon these surfaces. These particles 51, which are deposited upon the aforementioned surfaces, are high in oxygen content; they eventually flake off into the liquid phase and are insoluble therein. Accordingly, therefore, the oxidized polydiolefin withdrawn through line 21 is relatively cloudy. Consequently, after the oxidized polymer is stripped in tower 22, it must be filtered in 23 to remove these insoluble particles and to provide the required clarity for storage in tank 24.

Referring to FIG. 2, polydiolefin-catalyst feed and air are introduced into reactor 2 through lines 1 and 5, respectively. The reactor 2 again comprises head 3, body 4, and flange 45 therebetween which provides a means for separating the two members. Body 4 of reactor 2 also contains insulation 9, heating means 6, and stirring means 20. In contrast to FIG. 1, however, head 3 is either uninsulated or uninsulated and surrounded with a cooling means 31, e.g., a cold water jacket to provide a relatively low temperature therein. It is critical for the success of this invention that the temperature of the internal surface of the reactor head be maintained below about 200° F. Therefore, during the air blowing operation, vaporized solvent, which comes in contact with the walls of the reactor head, is condensed. This condensate washes down any entrained polymer which has previously been deposited upon the walls. The vaporized solvent and nitrogen is withdrawn through overhead line 10 and passed through condenser 11 and knockout drum 12 wherein the nitrogen and solvent are removed by means of lines 13 and 14, respectively. In accordance with this invention, fouling does not occur in the reactor and therefore the oxidized polymer withdrawn through line 21 is relatively clear. This clear air blown polydiolefin is subsequently stripped in tower 22 and passed directly to storage tank 24. It should be noted that the filtration step has been eliminated. An optional embodiment of this invention is to introduce pure solvent through line 35 to spray nozzle 36 which is positioned in spaced relation within reactor head 3. Solvent is then directed from the nozzle to the walls of reactor head 3.

Thus, in accordance with this invention, fouling has been prevented in the head and overhead line of a reactor during the preparation of an air blown polydiolefin. Previously, when the reactor fouled, the end product was relatively cloudy within a range of absorption from 50% to 75%. However, it is now possible to obtain an air blown polydiolefin which is relatively clear within a range of absorption from 10% to 20%. It is now possible therefore to use the oxidized polymer commerically without an expensive filtering operation.

The following example is submitted to illustrate and not to limit this invention.

*Example I*

A butadiene-styrene oil was prepared from the following charge:

| | Parts |
|---|---|
| Butadiene-1,3 | 80 |
| Styrene | 20 |
| Naphtha [1] | 200 |
| Dioxane | 40 |
| Isopropanol | 0.2 |
| Sodium [2] | 1.5 |

[1] Straight-run mineral spirits; API gravity, 56–58; flash, 80° F.; boiling range, 90 to 115° C.; aniline point, 100–110° F.

[2] Dispersed to a particle size of 10 to 50 microns by means of an Eppenbach homo-mixer.

The polymerization of this charge was carried out at 50° C. in a 2-liter autoclave provided with a mechanical agitator. Complete conversion was obtained in 4.5 hours. The catalyst was destroyed and removed from the resulting crude product and essentially all of the solvent removed by stripping to give a product of essentially 100% NVM. The resulting product had a viscosity of 1.5 poise at 50% NVM in Varsol solution and the nonvolatile portion thereof had an average molecular weight of about 8,000.

This polymeric oil was dissolved in Solvesso 100 (high percentage of aromatics with an API gravity of 30.2; a flash point of 118° C.; and a boiling range of 322° to 351° F.) to provide a 35% NVM solution. The solution was subsequently introduced into a reactor and blown with air to incorporate 10% of oxygen in the polymeric structure. Of the total runs performed, numbers 1 to 77 were conducted in a reactor which utilized the system described in FIG. 1. The temperatures on the periphery of the liquid phase and vapor phase were maintained at 240° and 230° F., respectively. In contrast, runs 78 to 119 were performed in a reactor in which an uninsulated head was utilized in accordance with this invention. The temperature on the periphery of the vapor phase was therefore lowered to about 180° F. The results were as follows:

| Run No. | Appearance | Measurement | Deposit on walls of head and overhead line |
|---|---|---|---|
| 1 to 77 | Cloudy | Ca 50% absorption on nephelometer. | Considerable solid particles thereon. |
| 78 to 119 | Clear | Ca 10% absorption on nephelometer. | Indicative of none. |

This example demonstrates that fouling in a reactor can be prevented by maintaining the temperature in the periphery of the vapor phase below 200° F. Furthermore, the end product is a clear oxidized polymer within the acceptable nephelometer absorption range of 10% to 20%.

Having described the general nature and specific embodiments of the present invention, the true scope is particularly pointed out in the appended claims.

What is claimed is:

1. An improved process for preparing an oxidized polydiolefin by preventing fouling in a reaction zone which comprises forming a solution of a polymer of a $C_4$ to $C_6$ conjugated diolefin in a hydrocarbon solvent in a reaction zone; blowing said solution with air to create a liquid phase of oxidized polymer in said reaction zone and a vapor phase of solvent and nitrogen in said reaction zone; and maintaining the temperature of the entire interior surface of the gas space above the liquid level of the reaction zone below 200° F. to provide a clear oxidized polymer in said liquid phase with a nephelometer absorption between 10 and 20%; said clear oxidized polymer being capable of being subsequently stripped and directly passed to storage.

2. The process according to claim 1 in which the polymer is selected from the group consisting of the homopolymer of butadiene and the copolymer of butadiene with styrene.

3. The process according to claim 1 in which the polymer is the copolymer of 75 to 85% butadiene with 25 to 15% styrene.

4. An improved process for preparing an oxidized polydiolefin which comprises forming a solution of a polymer of a $C_4$ to $C_6$ conjugated diolefin in a hydrocarbon solvent; blowing said solution with air to create a liquid phase of oxidized polymer in said reaction zone and a vapor phase of solvent and nitrogen in said reaction zone by maintaining the temperature of the entire interior surface of the gas space above the liquid level of the reaction zone below 200° F.; and stripping said oxidized polymer to provide a clear product directly with a nephelometer absorption of between 10% and 20%.

5. The process according to claim 4 in which the conjugated diolefin is selected from the group consisting of homopolymer of butadiene and the copolymer of butadiene with styrene.

6. The process according to claim 4 in which the polymer is a copolymer of 75 to 85% butadiene with 15 to 25% styrene.

7. A process for preparing an improved oxidized polydiolefin by preventing fouling in a reaction zone which comprises forming a solution of a polymer of a $C_4$ to $C_6$ conjugated diolefin in a hydrocarbon solvent; blowing said solution with air to create a liquid phase of oxidized polymer in said reaction zone and a vapor phase of solvent and nitrogen in said reaction zone by maintaining the temperature of the entire interior surface of the gas space above the liquid phase of the reaction zone below 200° F.; and spraying said interior surface of the gas space with said hydrocarbon solvent having been externally liquefied and purified to provide a clear oxidized polymer in said liquid phase with a nephelometer absorption of between 10% and 20%, said clear oxidized polymer being capable of being subsequently stripped and directly passed to storage.

8. A process which comprises preparing a solution of a copolymer of 80% butadiene with 20% styrene in an aromatic fraction having an API gravity of 30.2, a flash point of 118° C. and a boiling range of 322 to 351° F. in a reaction zone; blowing said solution with air to form a liquid phase of polymer with 10% oxygen incorporated in its structure in said reaction zone and a vapor phase of solvent and nitrogen in said reaction zone by maintaining the temperature of the entire interior surface of the gas space above the liquid level of the reaction zone at 180° F.; withdrawing a clear oxidized polymer in said liquid phase from said reaction zone with a nephelometer absorption of 10%; stripping said clear oxidized polymer from said liquid phase and passing said stripped polymer directly to storage.

9. A process which comprises preparing a solution of a copolymer of 80% butadiene with 20% styrene in an aromatic fraction having an API gravity of 30.2, a flash point of 118° C. and a boiling range of 322 to 351° F. in a reaction zone; blowing said solution with air to form a liquid phase of polymer with 10% oxygen incorporated in its structure in said reaction zone and a vapor phase of solvent and nitrogen in said reaction zone by maintaining the temperature of the entire interior surface of the gas space above the liquid level of the reaction zone at 180° F.; spraying said interior surface of said gas space with Solvesso having been externally liquified and purified; withdrawing a clear oxidized polymer in said liquid phase from said reaction zone with a nephelometer absorption of 10%; stripping said clear oxidized polymer from said liquid phase and passing said stripped polymer directly to storage.

References Cited in the file of this patent

UNITED STATES PATENTS

| | | |
|---|---|---|
| 2,472,362 | Barneby et al. | June 7, 1949 |
| 2,527,768 | Schulze et al. | Oct. 31, 1950 |
| 2,562,796 | Koch | July 31, 1951 |
| 2,581,094 | Gleason et al. | Jan. 1, 1952 |
| 2,582,899 | Barneby et al. | Jan. 15, 1952 |
| 2,745,824 | Melchore | May 15, 1956 |
| 2,750,266 | Roberts et al. | June 12, 1956 |
| 2,791,549 | Jahnig | May 7, 1957 |
| 2,791,618 | Moise et al. | May 7, 1957 |
| 2,826,618 | Gleason | Mar. 11, 1958 |
| 2,895,979 | Seagraves et al. | July 21, 1959 |